(Model.)

J. D. CHEEVER.
WATER PROOF AND PLASTIC COMPOUND.

No. 254,465. Patented Mar. 7, 1882.

WITNESSES
T. C. Brecht
Alfred R. Page

INVENTOR
John D. Cheever

UNITED STATES PATENT OFFICE.

JOHN D. CHEEVER, OF NEW YORK, N. Y.

WATER-PROOF AND PLASTIC COMPOUND.

SPECIFICATION forming part of Letters Patent No. 254,465, dated March 7, 1882.

Application filed January 24, 1882. (Model.)

*To all whom it may concern:*

Be it known that I, JOHN D. CHEEVER, a citizen of the United States, residing at New York, in the county of New York and State of New York, have invented certain new and useful Improvements in Water-Proof and Plastic Compounds, which may be calendered into sheets and molded in various forms; and I do hereby declare the following to be a full, clear, and exact description of the invention, such as will enable others skilled in the art to which it appertains to make and use the same, reference being had to the accompanying drawings, and to letters of reference marked thereon, which form a part of this specification, in which—

Figure 1:
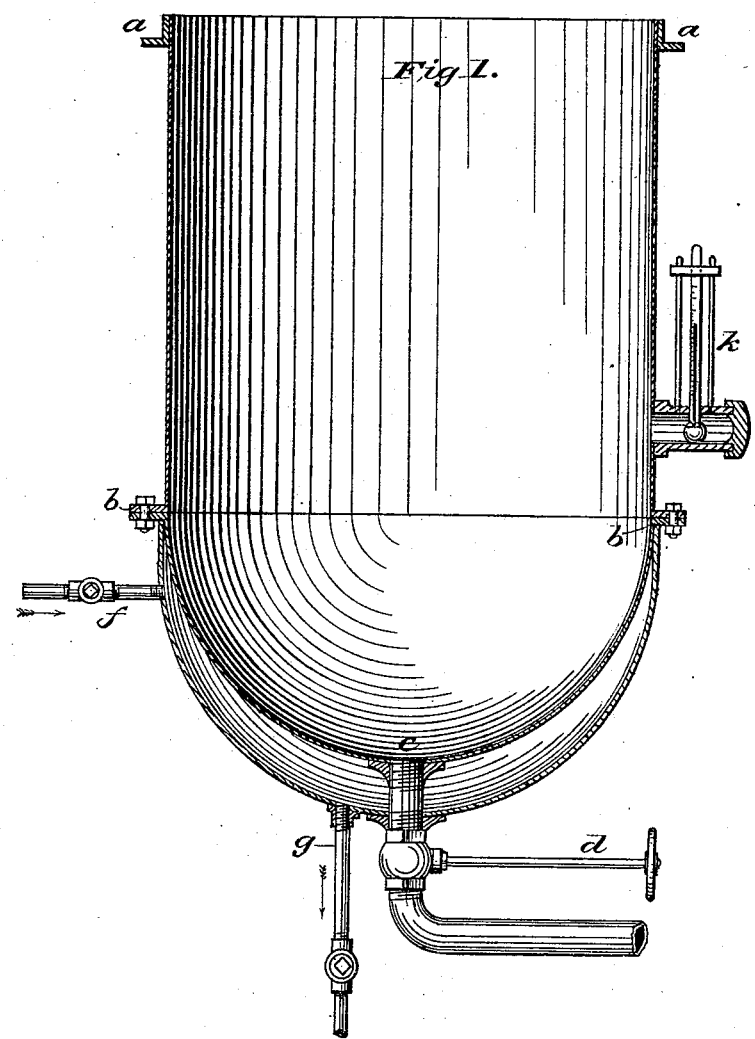

Figure 1 is a vertical cross-section of the heater in which the crude materials are mixed preparatory to chemical treatment. This heater is made mostly of sheet-copper, and consists of a cylinder thirty inches high and thirty inches diameter, with a hemispherical bottom. The sides are made of sheets weighing five pounds to the square foot, and the bottom twelve pounds to the square foot. Attached to the bottom is a steam-jacket made of copper weighing eight pounds to the square foot. In this drawing, $a$ represents angle-iron; $b$, bands of iron with bolts and nuts for tightly holding the steam-jacket to its place. $c$ is the discharge-pipe, by which the charge is withdrawn from the heater by turning the cock $d$. $f$ is the steam-pipe for heating the jacket, and $j$ the pipe for drawing off water from condensation. $k$ is a thermometer.

Figure 2:
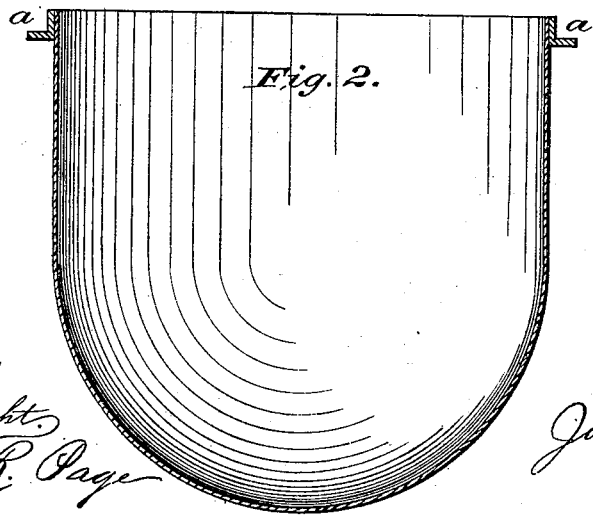

Fig. 2 is a vertical cross-section of the receptacle in which the chemical treatment is performed, technically called "vulcanizing." This vessel is made of sheet-copper, and consists of a cylinder fifteen inches high and thirty inches diameter, with a hemispherical bottom. The sides are made of sheets weighing three and a half pounds to the square foot, and the bottom four pounds to the square foot. In this drawing, $a$ represents angle-iron.

In the mixer, Fig. 1, I put one hundred and sixty pounds of boiled linseed-oil, twenty pounds of the oily, pasty product of petroleum known as "vaseline," described in the Patent of Robert A. Chesebrough, granted by the United States June 4, 1872, and numbered 127,568, and forty pounds of the substance known to the dealers and brokers in india-rubber and gutta-percha as "bastard gum," and to the natives of Yucatan, Honduras, and other sections of Central America as "pickum gum." This substance should be cut into small chips before it is added to the oil and vaseline. The mixture is first stirred and then heated to a temperature of 250° to 300° Fahrenheit, with occasional stirring, until the bastard or pickum gum has become wholly dissolved. It is better that the stirring should be done with wood, and the form of the implement that of a boat's oar. The heat is now removed by shutting off the steam from the steam-jacket, and the liquid drawn off and strained through a fine wire sieve, and put into casks to cool down to a temperature of about 100° Fahrenheit. Five gallons of this solution constitutes a charge or batch, which is put into the receptacle, Fig. 2, and a mixture of nine pounds of the protochloride of sulphur ($S_2Cl$) and nine pounds of bisulphide of carbon is added, while the whole is rapidly stirred by a wood stirrer. The chemical action soon takes place, and the mass swells to several times its original bulk, while dense volumes of hydrochloric-acid gas escape. The mass then relapses to a gelatinous consistency of a little more than its former bulk. It is then immediately removed and granulated by passing it through wood rollers or other crushing device. The grains thus formed are put into water and thoroughly washed in two or three baths, and finally rinsed in water slightly alkaline. This not only bleaches the product, but frees it from traces of acid. The powder or grains are next put into a cloth sack, and after the water has drained off it is placed in a strong press to remove nearly all the remaining water. Lastly, the powder is removed from the sack and placed on screens in a drying-room, and thoroughly dried of remaining dampness. The temperature of such rooms may range from that of a summer temperature to 150° Fahrenheit. It may now be put into barrels or bins for future use; or it may be masticated or ground, by the mullers employed for grinding india-rubber, at a temperature not above 150° Fahrenheit. It soon assumes a homogeneous, adhesive, translucent, and plastic mass of considerable elasticity, when it may be run into sheets and rolled into scrolls, ready for immediate or future use, by masticating it with a great number and variety of substances, and treating its compounds in mechanical respects precisely as is practiced with india-rubber compositions. Earthy pigments derived from the metals may be mixed with it in varying proportions, also powders of organic substances yielding a great variety of compositions of varying specific gravity, solidity, colors, and tints, which may be calendered into sheets and embossed; or it may be pressed into molds, forming durable and ornamental articles.

A useful application of the product is to the manufacture of floor-coverings. For example, I take one hundred pounds of the product described, one hundred pounds of finely-ground cork, two pounds of whiting, six and a half pounds of chrome-yellow, and masticate them together on the muller, then calender the compound, and spread it on burlaps. This mixture produces an olive tint. When other colors are desired I use a pigment of the required shade—as, for example, ultramarine for blue. These sheets may be printed in patterns of any desired design.

The proportion of cork I have named may be doubled for some purposes.

The proportions of the bastard gum and of the vaseline to the oil may be somewhat varied; but the best results are obtained from those I have named.

In my descriptions I have confined myself to the use of linseed-oil; but all the siccative oils afford similar results.

I have also specially mentioned the commercial product known as "vaseline;" but any of the analogous hydrocarbons obtained from petroleum, mineral wax, ozocerite, and the like may be substituted.

In order that my invention may be better understood, I desire here to state that I am aware of the treatment of siccative oils by chloride of sulphur by Alexander Parkes, who obtained a patent in England October 22, 1855, and that he mixed the product thus obtained with india-rubber and gutta-percha, collodion, resin, and coloring-matter. The product obtained by that process always retained acid, which worked the deterioration and destruction of the compositions of which it formed a part, causing them to become brittle, and when means were exercised to neutralize the acidity of that product it deported itself very much like oxidized oil, which also continues to resinify or harden until it becomes brittle. It was mainly to overcome these defects which instituted my experiments, which have resulted in effectual remedies. These consist partly in the details of the process which I have described, but essentially in the use of one or both of the additions to the oil before it is treated with chloride of sulphur. The pickum gum may be omitted with very good result for many uses; but for most purposes I prefer it.

The importance of attention to the order and details of the processes I have described will be understood, too, when it is noticed that when the oil is treated with the chloride of sulphur without the addition of the other two ingredients, and these are added by grinding them with that product, the result is of no practical use. The pickum gum, for instance, is too tacky to be masticated with the oil product by the rollers required for such purposes, and when the two are mixed by other means the composition is unlike that obtained, as I have described. The pickum gum is not vulcanizable like caoutchouc, although its character changes in my process; nor does it possess the qualities of gutta-percha. It has therefore found no more than an experimental market up to the present time, although it is abundantly found.

Having thus described my invention, what I claim, and desire to secure by Letters Patent, is—

1. The product obtained by mixing the siccative oils and vaseline, and treating the mixture with chloride of sulphur in the manner described.

2. The product obtained by mixing the siccative oils, vaseline, and pickum gum, and treating the mixture in the manner described.

3. The composition for the manufacture of sheets for floor-coverings, embossing artificial leather, and for articles obtained from molds, consisting of the product obtained from the mixture of the siccative oils, vaseline, and pickum gum with powdered cork, tan-bark, short fibers, and coloring-matter, substantially as described.

In testimony whereof I affix my signature in presence of two witnesses.

JOHN D. CHEEVER.

Witnesses:
VICTOR E. BURKE,
ALFRED R. PAGE.